US012427724B2

(12) United States Patent
Okunaka et al.

(10) Patent No.: US 12,427,724 B2
(45) Date of Patent: Sep. 30, 2025

(54) THREE-DIMENSIONAL SHAPING METHOD AND THREE-DIMENSIONAL SHAPING APPARATUS

(71) Applicant: HONDA MOTOR CO., LTD., Tokyo (JP)

(72) Inventors: Tatsuya Okunaka, Wako (JP); Haruka Ito, Wako (JP); Mai Yokoi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 163 days.

(21) Appl. No.: 18/127,030

(22) Filed: Mar. 28, 2023

(65) Prior Publication Data

US 2023/0311421 A1 Oct. 5, 2023

(30) Foreign Application Priority Data

Mar. 30, 2022 (JP) ................. 2022-056431

(51) Int. Cl.
*B29C 64/393* (2017.01)
*B29C 64/118* (2017.01)
*B33Y 50/02* (2015.01)

(52) U.S. Cl.
CPC ............ *B29C 64/393* (2017.08); *B33Y 50/02* (2014.12); *B29C 64/118* (2017.08)

(58) Field of Classification Search
CPC ..... B29C 64/118; B29C 64/393; B33Y 10/00; B33Y 50/02; B22F 10/18; B22F 10/80; B22F 5/10
See application file for complete search history.

(56) References Cited

U.S. PATENT DOCUMENTS

| 10,077,854 | B1 | 9/2018 | Korobkov |
| 2016/0207260 | A1 | 7/2016 | Lee et al. |
| 2016/0263832 | A1 | 9/2016 | Bui et al. |
| 2018/0319076 | A1 | 11/2018 | Hikmet et al. |
| 2020/0114572 | A1 | 4/2020 | Hikmet et al. |
| 2020/0198059 | A1 | 6/2020 | Dutta et al. |
| 2020/0307084 | A1 | 10/2020 | Kajita et al. |
| 2022/0161331 | A1 | 5/2022 | Shimizu et al. |
| 2024/0017479 | A1* | 1/2024 | Belvisi ................. B29C 64/118 |

FOREIGN PATENT DOCUMENTS

| JP | 09-323361 | 12/1997 |
| JP | 2019-502568 | 1/2019 |
| JP | 2020-522410 | 7/2020 |
| JP | 2020-163738 | 10/2020 |

(Continued)

OTHER PUBLICATIONS

Japanese Office Action for Japanese Patent Application No. 2022-056431 dated Jan. 9, 2024.

*Primary Examiner* — Yunju Kim
(74) *Attorney, Agent, or Firm* — Amin, Turocy & Watson, LLP

(57) ABSTRACT

In a three-dimensional shaping method and a three-dimensional shaping apparatus, a shaping path of each of a plurality of layers includes an inner shaping path and outer shaping path for shaping an inner wall portion and outer wall portion that surround a space and are adjacent in an inward-outward direction. The progression directions of the inner shaping path and outer shaping path are the same direction.

7 Claims, 18 Drawing Sheets

(56) References Cited

FOREIGN PATENT DOCUMENTS

| | | |
|---|---|---|
| JP | 2020-534437 | 11/2020 |
| JP | 2021-020417 | 2/2021 |
| JP | 2021-505432 | 2/2021 |
| JP | 7264236 | 4/2023 |
| WO | 2019/111241 | 6/2019 |

\* cited by examiner

THREE-DIMENSIONAL SHAPING METHOD AND THREE-DIMENSIONAL SHAPING APPARATUS

CROSS-REFERENCE TO RELATED APPLICATIONS

This application is based upon and claims the benefit of priority from Japanese Patent Application No. 2022-056431 filed on Mar. 30, 2022, the contents of which are incorporated herein by reference.

BACKGROUND OF THE INVENTION

Field of the Invention

The present invention relates to a three-dimensional shaping method and a three-dimensional shaping apparatus.

Description of the Related Art

JP 2021-020417 A discloses a three-dimensional shaping apparatus that shapes a three-dimensional object using a material extrusion method that is one type of additive shaping method (additive manufacturing method).

SUMMARY OF THE INVENTION

When shaping a three-dimensional object having an internal space using an additive manufacturing method, the three-dimensional object is shaped using the technique described below.

First, three-dimensional data of the three-dimensional object is divided or sliced into a plurality of layers (two-dimensional data). Then, for each layer among the plurality of layers resulting from the slicing, a shaping path for shaping the three-dimensional object and a progression direction of the shaping path are determined. After this, the three-dimensional object is shaped according to the shaping path and progression direction for each of the plurality of layers.

With the additive manufacturing method, for each of the plurality of layers, a plurality of annular wall portions surrounding the space and adjacent to each other in the inward-outward direction are formed. By layering the plurality of layers in a layering direction, in a state where the plurality of annular wall portions are adjacent, the three-dimensional object is formed. In this case, the shaping path (wall portion shaping path) for shaping the wall portion on the outer side is formed by connecting outward direction components (point components). Furthermore, the shaping path (wall portion shaping path) for shaping the wall portion on the inner side is formed by connecting inward point components. Accordingly, for two wall portion shaping paths, the progression directions thereof are opposite from each other.

Here, when connecting two wall portion shaping paths and shaping two wall portions in a single instance, it is necessary to perform shaping along the one wall portion shaping path that is the outgoing path and then, after turning back at the connection portion for the two wall portion shaping paths, to perform shaping along the other wall portion shaping path that is the return path. Due to this, there is inconsistent interval of heat inputs anywhere along the wall shaping path in each of the plurality of layers. As a result, the mechanical strength of the three-dimensional object is reduced. Furthermore, shape defects such as warping occur in the three-dimensional object.

The present invention has the object of solving the above problems.

A first aspect of the present invention is a three-dimensional shaping method for shaping a three-dimensional object including a space therein, using an additive manufacturing method, the three-dimensional shaping method including a slicing step of slicing three-dimensional data of the three-dimensional object into a plurality of layers, a path determining step of determining a shaping path for shaping the three-dimensional object and a progression direction of the shaping path, for each of the plurality of layers resulting from the slicing, and a shaping step of shaping the three-dimensional object according to the shaping path and the progression direction in each of the plurality of layers, wherein the shaping path of each of the plurality of layers includes a plurality of wall portion shaping paths for shaping a plurality of annular wall portions that surround the space and are adjacent to each other in an inward-outward direction, and the progression directions of respective wall portion shaping paths face a same direction.

A second aspect of the present invention is a three-dimensional shaping apparatus that shapes a three-dimensional object including a space therein, using an additive manufacturing method, the three-dimensional shaping apparatus including a data slicing section configured to acquire three-dimensional data of the three-dimensional object and slice the acquired three-dimensional data into a plurality of layers, the path determining section configured to determine a shaping path for shaping the three-dimensional object and a progression direction of the shaping path, for each of the plurality of layers sliced by the data slicing section, and a shaping section configured to shape the three-dimensional object according to the determined shaping path and progression direction in each of the plurality of layers determined by the path determining section, wherein the shaping path of each of the plurality of layers includes a plurality of wall portion shaping paths for shaping a plurality of annular wall portions that surround the space and are adjacent to each other in an inward-outward direction, and the progression directions of respective wall portion shaping paths face a same direction.

With the present invention, since the plurality of wall portion shaping paths are oriented in the same direction, it is possible to preserve a constant heat interval at any location along the wall portion shaping paths in each of the plurality of layers. Due to this, the mechanical strength of the three-dimensional object is improved. Furthermore, deformation of the shape of the three-dimensional object can be suppressed.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
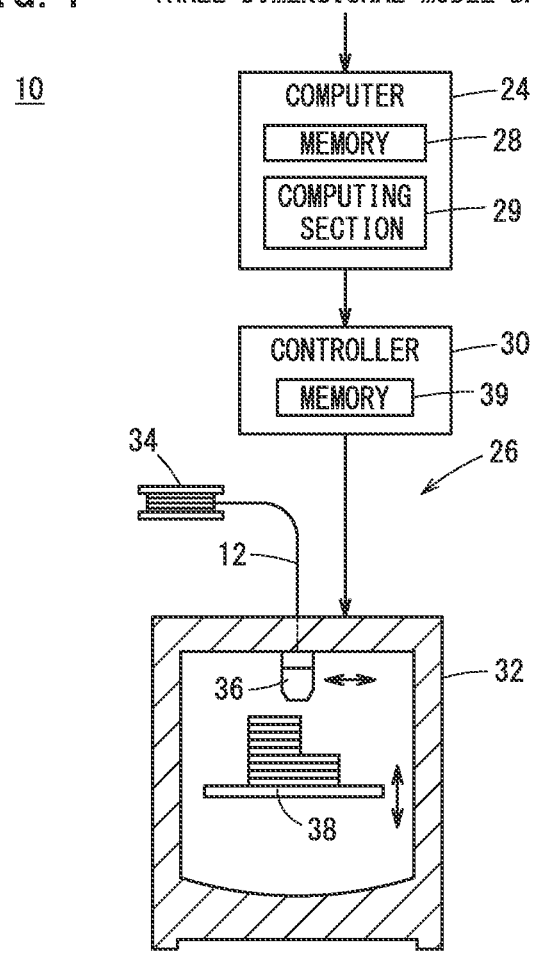
FIG. 1 is a configurational view of a three-dimensional shaping apparatus according to the present embodiment.

FIG. 1 is a configurational view of a three-dimensional shaping apparatus 10 according to the present embodiment. The three-dimensional shaping apparatus 10 shapes a three-dimensional object 14 by layering a shaping material 12 in a desired shape.

Figure 2:
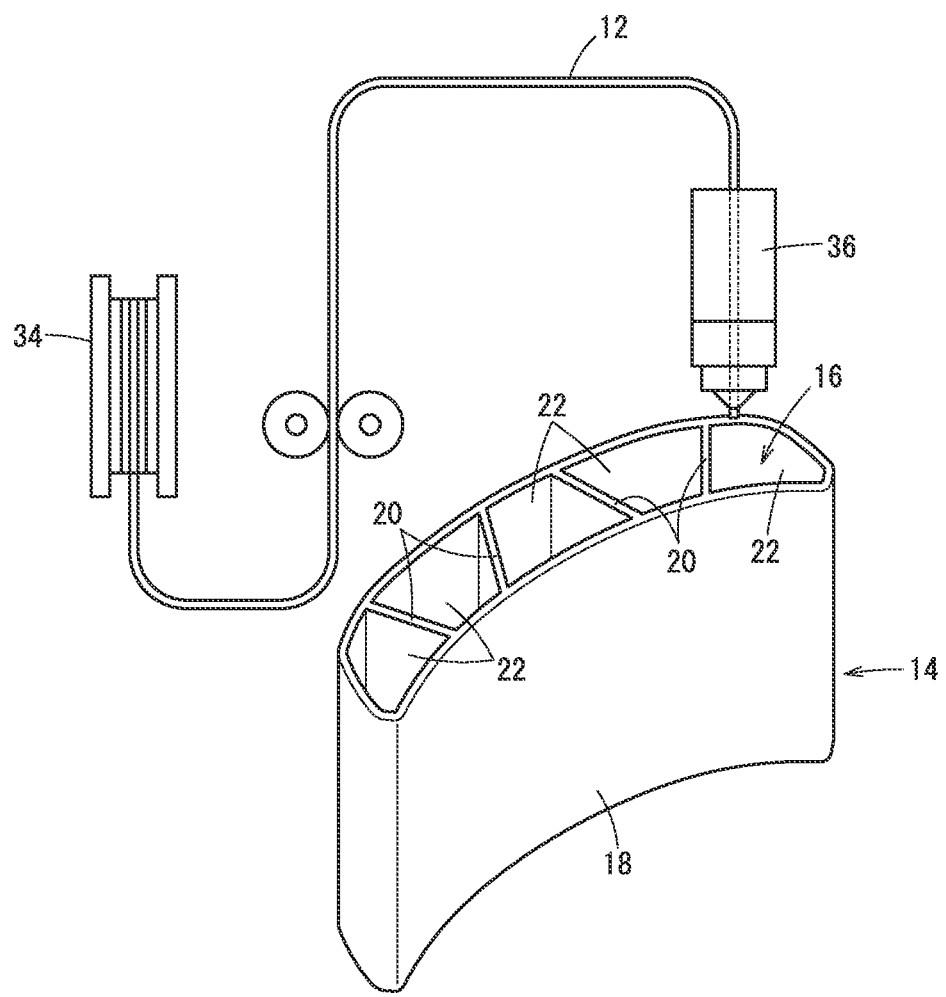
FIG. 2 is a perspective view of a three-dimensional object.

As shown in FIG. 2, the three-dimensional object 14 is a three-dimensional object having a space 16 therein. The three-dimensional object 14 is a car part such as a duct as shown in FIG. 2, for example. The three-dimensional object 14 shown in FIG. 2 is an annular object that extends in a prescribed direction (layering direction) (up-down direction in FIG. 2).

The three-dimensional object 14 includes an annular wall 18 and a plurality of ribs 20. The space 16 is formed on the inner side of the annular wall 18. The plurality of ribs 20 extend in a prescribed direction. The plurality of ribs 20 divide the space 16 into a plurality of sub-spaces 22. Each of the plurality of ribs 20 is connected to the annular wall 18. The three-dimensional object 14 need only include at least one rib 20. Alternatively, the three-dimensional object 14 need not include any ribs 20.

The shaping material 12 is filaments or pellets made of thermoplastic resin such as ABS. Alternatively, the shaping material 12 is filaments or pellets made of metal. The following describes a case in which the shaping material 12 is ABS filaments. The shape (e.g., the diameter of the filaments or pellets) and substance of the shaping material 12 should be suitably set according to the intended use or the like of the three-dimensional object 14.

As shown in FIG. 1, the three-dimensional shaping apparatus 10 includes a computer 24 (data slicing section, path determining section) and an additive shaping apparatus (additive manufacturing apparatus) 26 (shaping section).

The computer 24 includes a memory 28 and a computing section 29. The computing section 29 can be formed by a processor such as a CPU (Central Processing Unit) or a GPU (Graphics Processing Unit), for example. That is, the computing section 29 can be formed by processing circuitry. With the computer 24, the functions of the data slicing section and the path determining section are realized by having the computing section 29 read and execute a program stored in the memory 28.

At least a portion of the data slicing section and the path determining section may be realized by an integrated circuit such as an ASIC (Application Specific Integrated Circuit) or an FPGA (Field-Programmable Gate Array). Furthermore, at least a portion of the data slicing section and the path determining section may be formed by an electronic circuit including a discrete device.

The memory 28 can be formed by a volatile memory (not shown in the drawings) and a nonvolatile memory (not shown in the drawings). The volatile memory can be exemplified by a RAM (Random Access Memory) or the like, for example. This volatile memory is used as a working memory of the processor, and temporarily stores data and the like needed for processing and computing. The nonvolatile memory can be exemplified by a ROM (Read Only Memory), a flash memory, or the like, for example. This nonvolatile memory is used as a holding memory, and stores programs, tables, maps, and the like. At least a portion of the memory 28 may be included in the processor, integrated circuit, or the like described above.

The additive manufacturing apparatus 26 is a so-called 3D printer. Specifically, the additive manufacturing apparatus 26 includes a controller 30, a chassis 32, a material supply source 34, a nozzle 36, and a stage 38. The additive manufacturing apparatus 26 shapes the three-dimensional object 14 using the FFF (Fused Filament Fabrication) method, which is one type of additive manufacturing method.

The controller 30 includes a memory 39. The controller 30 controls the material supply source 34, the nozzle 36, a nozzle moving mechanism (not shown in the drawings), and a stage moving mechanism (not shown in the drawings), based on data stored in the memory 39.

The chassis 32 is a body portion of the 3D printer. The stage 38 is arranged approximately horizontally inside the chassis 32. The stage 38 can be moved in the up-down direction of FIG. 1 by the stage moving mechanism. The nozzle 36 is arranged above the stage 38 inside the chassis 32. The nozzle 36 is arranged facing the top surface of the stage 38. The nozzle 36 can be moved in the horizontal direction of FIG. 1 by the nozzle moving mechanism. The material supply source 34 is a reel around which the shaping material 12 is wound, as shown in FIGS. 1 and 2. The material supply source 34 supplies the shaping material 12 to the nozzle 36. The material supply source 34 may be formed as something other than a reel.

An operation of the three-dimensional shaping apparatus 10 (three-dimensional shaping method) formed as described above will be described while referencing FIGS. 3 to 12. Here, FIGS. 1 and 2 will also be referenced in the description as necessary.

Figure 3:
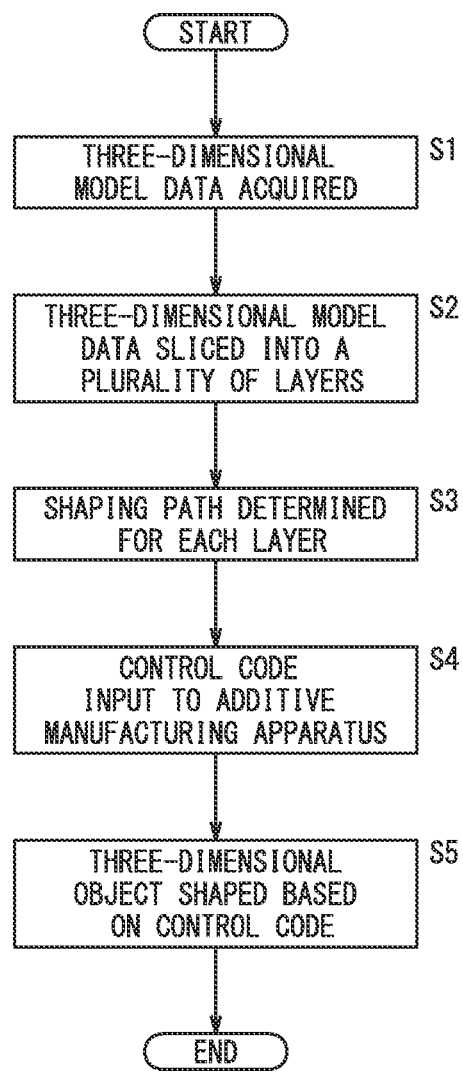
FIG. 3 is a flow chart of a three-dimensional shaping method according to the present embodiment.

At step S1 of FIG. 3, the computer 24 (see FIG. 1) acquires data of a three-dimensional model (three-dimensional data) that the three-dimensional object 14 (see FIG. 2) is to become. The three-dimensional data is a collection of triangular data.

At the following step S2 (slicing step), the computer 24 functions as the data slicing section. The computer 24 slices the acquired three-dimensional data into a plurality of layers. Specifically, the computing section 29 of the computer 24 defines a prescribed direction of the three-dimensional object 14 as a layering direction when shaping the three-dimensional object 14. Next, the computing section 29 of the computer 24 slices the three-dimensional data at prescribed intervals along the layering direction. Due to this, the three-dimensional model (three-dimensional data) is sliced or divided into a plurality of layers. Accordingly, each of the plurality of layers resulting from the slicing is data of a two-dimensional model (two-dimensional data).

Figure 4:
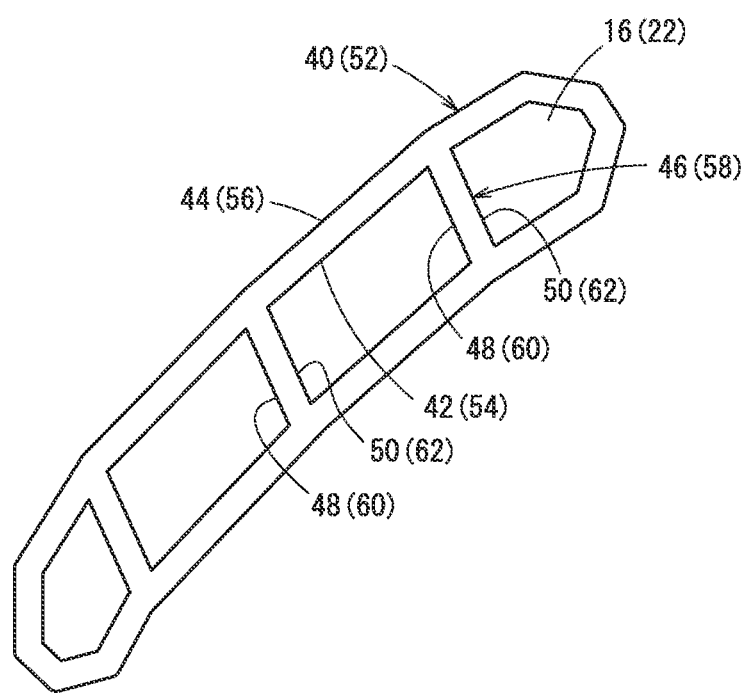
FIG. 4 is a descriptive diagram showing one layer.

FIG. 4 schematically shows the shape of one layer (two-dimensional model) within the three-dimensional model. In the shape of this one layer, the location corresponding to the annular wall 18 (see FIG. 2) is an annular wall portion 40. The annular wall portion 40 includes an inner wall portion 42 (annular wall portion) and an outer wall portion 44 (annular wall portion). The inner wall portion 42 forms the inner circumferential surface of the annular wall portion 40 surrounding the space 16. The outer wall portion 44 forms the outer circumferential surface of the annular wall 18. The inner wall portion 42 and the outer wall portion 44 are adjacent in an inward-outward direction of the three-dimensional object 14. By making the inner wall portion 42 and the outer wall portion 44 adjacent in the inward-outward direction of the three-dimensional object 14, the annular wall portion 40 is formed. Accordingly, when the plurality of layers are layered in the layering direction, the annular wall 18 is formed by the plurality of annular wall portions 40 layered in the layering direction.

Furthermore, in the shape of the one layer, the locations corresponding respectively to the plurality of ribs 20 are rib wall portions 46. Each rib wall portion 46 includes two wall portions 48 and 50. The wall portion 48 is a wall portion for forming one sub-space 22 among the two sub-spaces 22 sandwiching the rib wall portion 46. The wall portion 50 is a wall portion for forming the other sub-space 22 among the two sub-spaces 22 sandwiching the rib wall portion 46. By making two wall portions 48 and 50 adjacent to each other, one rib wall portion 46 is formed. Accordingly, when the plurality of layers are layered in the layering direction, a rib 20 is formed by the plurality of rib wall portions 46 layered in the layering direction.

The computing section 29 (see FIG. 1) of the computer 24 defines a frame-shaped region corresponding to the annular wall portion 40 as a frame region 52, for the two-dimensional data of one layer. The computing section 29 of the computer 24 defines a region corresponding to the inner wall portion 42, within the frame region 52, as an inner region 54. The computing section 29 of the computer 24 defines a region corresponding to the outer wall portion 44, within the frame region 52, as an outer region 56. Accordingly, the inner region 54 and the outer region 56 are adjacent to each other.

The computing section 29 of the computer 24 defines a region corresponding to the rib wall portion 46 as a rib region 58, for the two-dimensional data of one layer. The computing section 29 of the computer 24 defines regions corresponding to the two wall portions 48 and 50 of the rib wall portion 46 as two wall regions 60 and 62. Accordingly, the two wall regions 60 and 62 are adjacent to each other.

At the following step S3 (path determining step), the computer 24 functions as the path determining section. The computer 24 determines the shaping path for shaping the three-dimensional object 14 and the progression direction (shaping direction) of the shaping path, for each of the plurality of layers resulting from the slicing.

Figure 5:
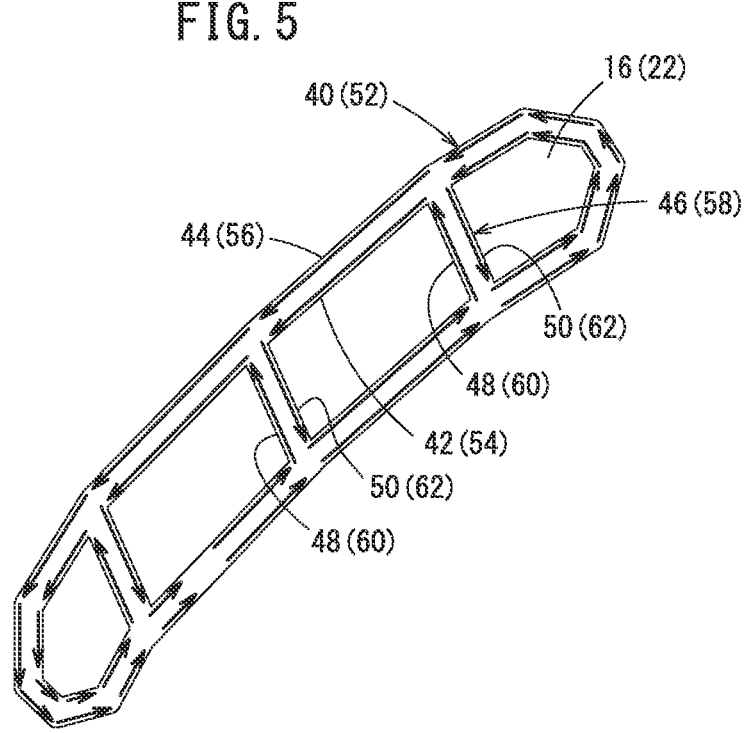
FIG. 5 is a descriptive diagram showing a shaping direction in one layer.

Specifically, at step S3, the computing section 29 of the computer 24 first defines the shaping direction along the inner region 54, the outer region 56, and the wall regions 60 and 62. FIG. 5 is a descriptive diagram showing the shaping direction with arrows, for the two-dimensional model (two-dimensional data of one layer) of FIG. 4.

As shown in FIG. 5, the computing section 29 (see FIG. 1) of the computer 24 sets the shaping direction to be the same direction for the inner region 54 and the outer region 56, for one layer. Furthermore, the computing section 29 of the computer 24 sets the shaping directions for the two wall regions 60 and 62, which form one rib region 58, to be directions opposite from each other, for one layer.

Figure 6:
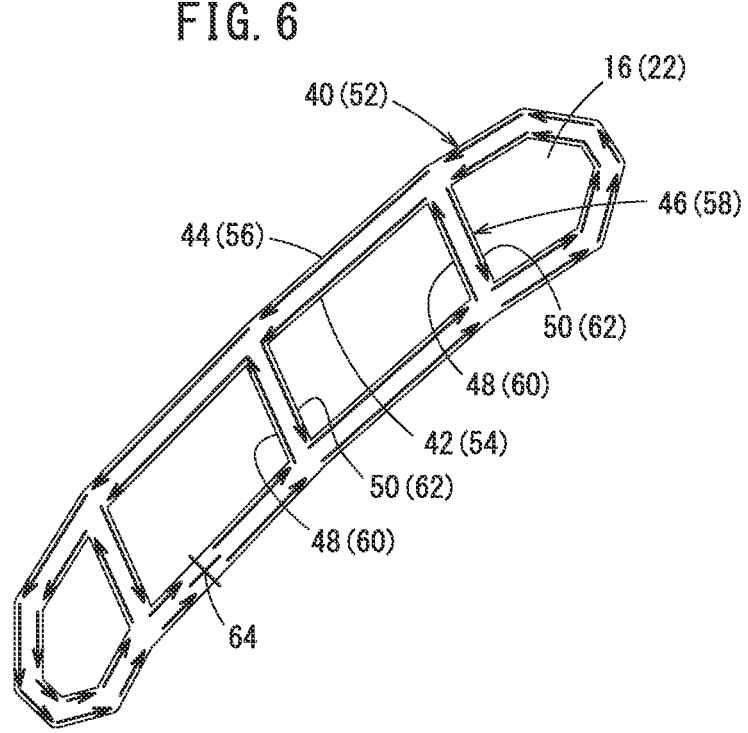
FIG. 6 is a descriptive diagram showing a seam point in one layer.

Next, as shown in FIG. 6, the computing section 29 (see FIG. 1) of the computer 24 sets a seam point 64, which is a start point and an end point of the shaping, for one layer. When the shaping is actually performed, the location corresponding to the seam point 64 in the three-dimensional object 14 (see FIG. 2) has a slightly distorted shape in an external view. Therefore, a location where distortion will not stand out in the three-dimensional object 14 is preferably set as the seam point 64.

Next, the computing section 29 of the computer 24 determines the shaping path such that the shaping can be performed in a single instance (or in a unicursal or traversable manner) for one layer. In this case, the computing section 29 of the computer 24 treats the inner region 54, outer region 56, and wall regions 60 and 62 of one layer as a single group. The computing section 29 of the computer 24 determines a shaping path that can be traced along one group in a single instance.

Figure 7:
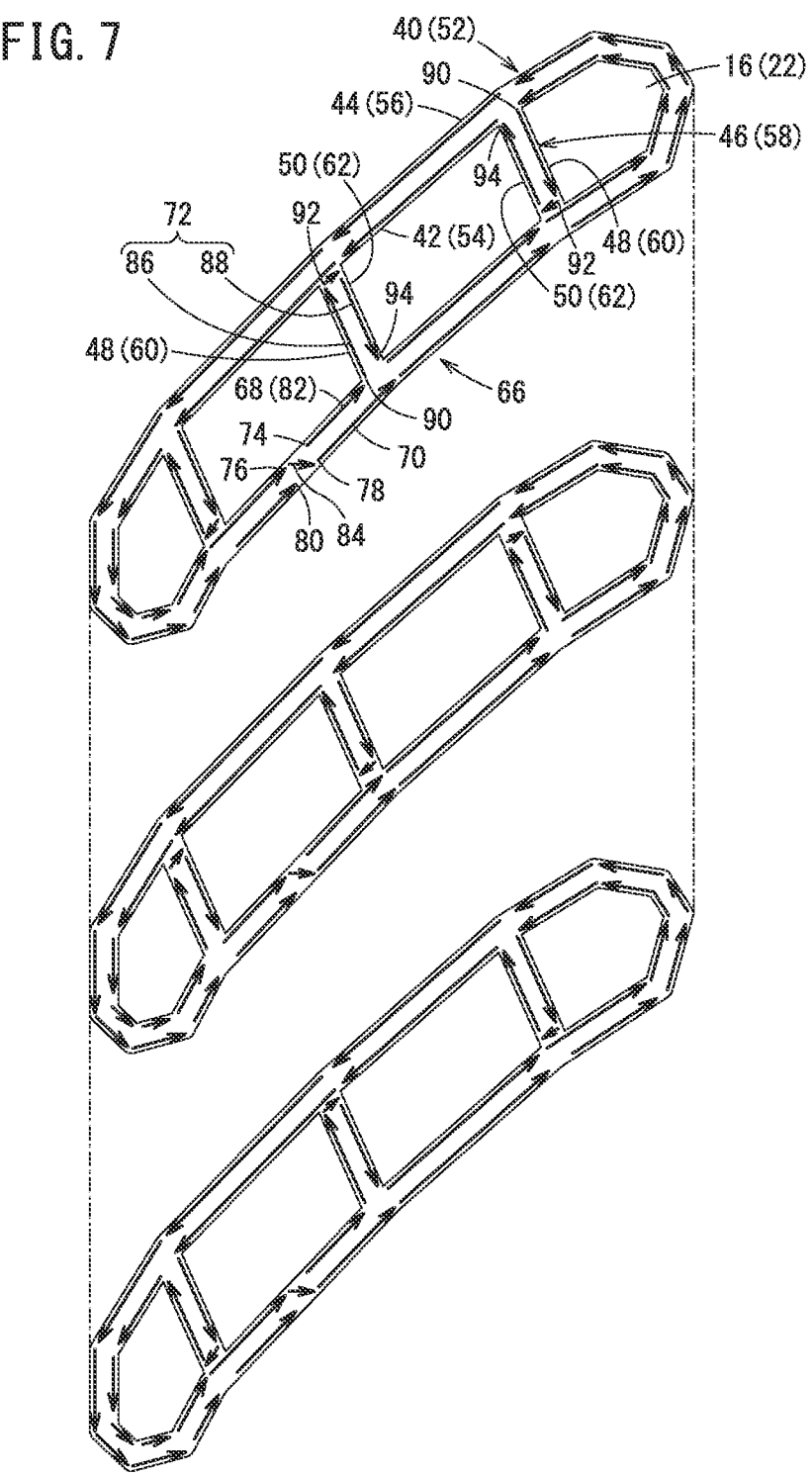
FIG. 7 is a descriptive diagram showing shaping paths and shaping directions in a plurality of layers.

FIG. 7 is a descriptive diagram showing a shaping path 66 and a shaping direction for each of three layers.

For each of the three layers, the shaping path 66 includes an inner shaping path 68 (wall portion shaping path), an outer shaping path 70 (wall portion shaping path), and a rib shaping path 72.

The inner shaping path 68 is a shaping path for shaping the inner wall portion 42. The computing section 29 (see FIG. 1) of the computer 24 forms the inner shaping path 68 shown in FIG. 7 by connecting the arrows set in the inner region 54 shown in FIGS. 5 and 6. In this case, a start point 74 and an end point 76 of the inner shaping path 68 are set at locations near the seam point 64 (see FIG. 6). The inner shaping path 68 is a loop-shaped path that begins at the start point 74 and extends along the inner region 54 to reach the end point 76.

The outer shaping path 70 is a shaping path for shaping the outer wall portion 44. The computing section 29 (see FIG. 1) of the computer 24 forms the outer shaping path 70 by connecting the arrows set in the outer region 56 shown in FIGS. 5 and 6. Accordingly, the outer shaping path 70 shown in FIG. 7 is set outside the inner shaping path 68, in a manner to be adjacent to the inner shaping path 68. In this case, a start point 78 and an end point 80 of the outer shaping path 70 are set at locations near the seam point 64 (see FIG. 6). The start point 78 and the end point 80 of the outer shaping path 70 are set farther outward than the start point 74 and the end point 76 of the inner shaping path 68. The outer shaping path 70 is a loop-shaped path that starts at the start point 78 and extends along the outer region 56 to reach the end point 80.

In this way, the shaping direction of the inner shaping path 68 and the shaping direction of the outer shaping path 70 are set to be the same direction.

Furthermore, the computing section 29 (see FIG. 1) of the computer 24 determines a shaping path for shaping whichever of the inner shaping path 68 and the outer shaping path 70 is to be shaped first, as a first wall portion shaping path 82. FIG. 7 shows a case in which the inner shaping path 68 is determined to be the first wall portion shaping path 82. In this case, the computing section 29 (see FIG. 1) of the computer 24 determines the single-instance shaping path 66 by connecting the inner shaping path 68 and outer shaping path 70, which are adjacent to each other, outward from the first wall portion shaping path 82.

Specifically, for the inner shaping path 68 and the outer shaping path 70 that are adjacent to each other, the computing section 29 of the computer 24 connects the end point 76 (first end point) of the inner shaping path 68 that forms the wall portion first to the start point 78 (first stat point) of the outer shaping path 70 that forms the wall portion afterward, via a connection path 84. Due to this, the shaping path 66 including the inner shaping path 68, the connection path 84, and the outer shaping path 70 can be traced in a single instance.

In a case where the outer shaping path 70 is determined as the first wall portion shaping path 82, the computing section 29 of the computer 24 should connect the end point 80 (first end point) of the outer shaping path 70 forming the wall portion first and the start point 74 (first start point) of the inner shaping path 68 forming the wall portion afterward, via the connection path 84.

Figure 8A:
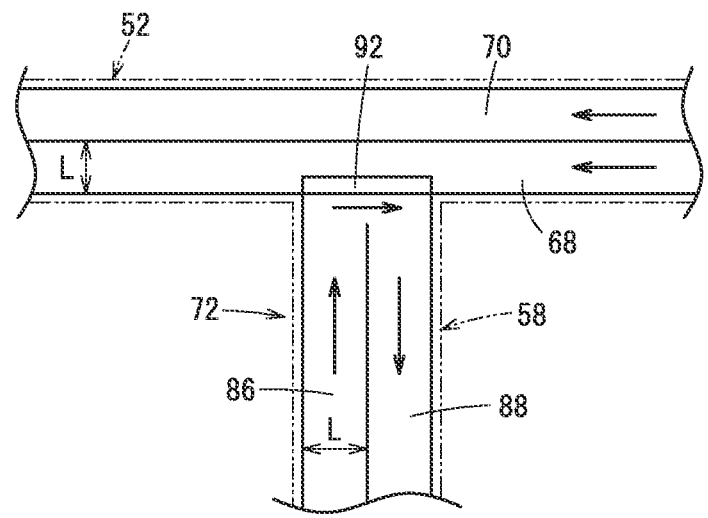
FIG. 8A is a descriptive diagram showing a state in which a portion of a turnback point overlaps with an inner shaping path.

The three-dimensional object 14 is shaped by moving the nozzle 36 (see FIGS. 1 and 2) along the shaping path 66. Therefore, as shown in FIG. 8A, the inner shaping path 68 and outer shaping path 70 each actually have a width (line width L) sufficient to bury the frame region 52. The line width L of each of the inner shaping path 68 and the outer shaping path 70 corresponds to the width of the shaping material 12 (see FIGS. 1 and 2).

Furthermore, the computing section 29 (see FIG. 1) of the computer 24 sets the rib shaping path 72 (see FIG. 7) for one layer as described below. Specifically, the computing section 29 of the computer 24 sets a rib outgoing path 86 and a rib return path 88, forming the rib shaping path 72.

The rib outgoing path 86 is a shaping path corresponding to one wall region, namely the wall region 60, among the two wall regions 60 and 62. In the inner shaping path 68, the rib outgoing path 86 is a shaping path that extends from a start point 90 (second start point), which corresponds to one end portion of the rib wall portion 46, toward the inside of the space 16. The rib outgoing path 86 extends to a turnback point 92, which corresponds to the other end portion of the rib wall portion 46.

The rib return path 88 is a shaping path that corresponds to the other wall region, namely the wall region 62, among the two wall regions 60 and 62. In the inner shaping path 68, the rib return path 88 is a shaping path that extends from the turnback point 92 to an end point 94 (second end point) that corresponds to the one end portion of the rib wall portion 46.

Accordingly, the rib outgoing path 86 and the rib return path 88 are shaping paths that are adjacent to each other. Furthermore, the rib outgoing path 86 and the rib return path 88 are shaping paths that extend in opposite directions from each other. Therefore, the start point 90 of the rib outgoing path 86 and the end point 94 of the rib return path 88 are preferably set close to each other.

As shown in FIG. 8A, the rib shaping path 72 actually has a width (line width L) sufficient to bury the rib region 58. That is, the rib outgoing path 86 and the rib return path 88 forming the rib shaping path 72 each have a line width L. The line width L of each of the rib outgoing path 86 and the rib return path 88 corresponds to the width of the shaping material 12 (see FIGS. 1 and 2).

Figure 8B:
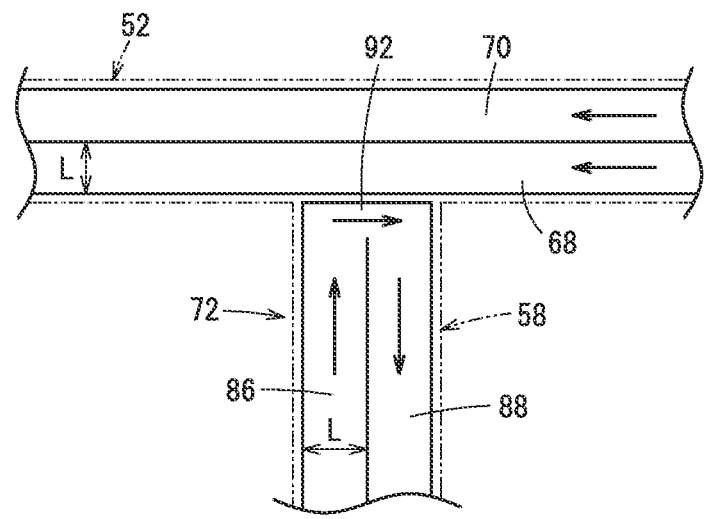
FIG. 8B is a descriptive diagram showing a state in which a portion of the turnback point does not overlap with the inner shaping path.

A portion of the turnback point 92 overlaps with the inner shaping path 68. Specifically, a portion of the turnback point 92 preferably overlaps with approximately L/2 of the inner shaping path 68. Due to this, even if the ABS resin serving as the shaping material 12 is cooled and contracts after shaping of the three-dimensional object 14, the annular wall 18 (annular wall portion 40) and the rib 20 (rib wall portion 46) can be favorably and reliably connected. Accordingly, as shown in FIG. 8B, in a case where a portion of the turnback point 92 does not overlap with the inner shaping path 68, there may be cases where the annular wall 18 (annular wall portion 40) and the rib 20 (rib wall portion 46) become disconnected after shaping of the three-dimensional object 14.

In a case where a plurality of rib shaping paths 72 are set according to a plurality of rib wall portions 46 (see FIG. 7) for one layer, the computing section 29 (see FIG. 1) of the computer 24 preferably sets the plurality of rib shaping paths 72 as described below. Specifically, the computing section 29 of the computer 24 sets the plurality of rib shaping paths 72 such that, between adjacent rib wall portions 46, the position of one end portion of a rib wall portion 46 and the position of the other end portion of the rib wall portion 46 are switched.

As shown in FIG. 7, when shaping three rib wall portions 46 in one layer, three rib shaping paths 72 are set. In this case, the positions of the start point 90 and end point 94 of the rib outgoing path 86 and the positions of the turnback point 92 differ from each other between adjacent rib shaping paths 72.

In this way, the single-instance shaping path 66 including the inner shaping path 68, the outer shaping path 70, the rib shaping path 72, and the connection path 84 is defined for one layer.

It should be noted that the larger the width of the rib wall portion 46, the easier it is for the temperature of the rib wall portion 46 to increase during shaping. Furthermore, the smaller the width of the rib wall portion 46, the easier it is for the temperature of the rib wall portion 46 to decrease during shaping. Therefore, at step S3 of FIG. 3, the computing section 29 (see FIG. 1) of the computer 24 preferably sets the shaping path 66 such that the width of the annular wall portion 40 (see FIG. 7) and the width of the rib wall portion 46 are the same. Due to this, it is possible to control the temperature of the rib wall portion 46 to be a desired temperature during shaping. As a result, the mechanical strength of the three-dimensional object 14 (see FIG. 2) and the shape of the three-dimensional object 14 can be preserved.

In a case where the outer shaping path 70 is traced after the inner shaping path 68 and rib shaping path 72 have been traced, it is possible to improve the appearance of the three-dimensional object 14. In a case where the outer shaping path 70 is traced before the inner shaping path 68 and rib shaping path 72 are traced, it is possible to improve the dimensional accuracy of the three-dimensional object 14.

The computing section 29 of the computer 24 defines the single-instance shaping path 66 in the manner described above, for each of the plurality of layers. In this case, the computing section 29 of the computer 24 sets the rib shaping path 72 such that the position of the one end portion of the rib wall portion 46 and the position of the other end portion of the rib wall portion 46 are switched between two layers that are adjacent in the layering direction. That is, as shown in FIG. 7, when viewing two layers that are adjacent in the layering direction, the positions of the start point 90 and end point 94 of the rib outgoing path 86 and the position of the turnback point 92 differ from each other between rib shaping paths 72 that are adjacent in the layering direction.

The shaping direction of the inner shaping path 68, the shaping direction of the outer shaping path 70, and the shaping direction of the connection path 84 are each set to be in the same direction, between two layers that are adjacent in the layering direction.

As described above, the single-instance shaping path 66 is defined for each of the plurality of layers.

FIGS. 9 to 12 are descriptive diagrams showing variations of shaping paths other than the shaping path 66 shown in FIG. 7.

Figure 9:
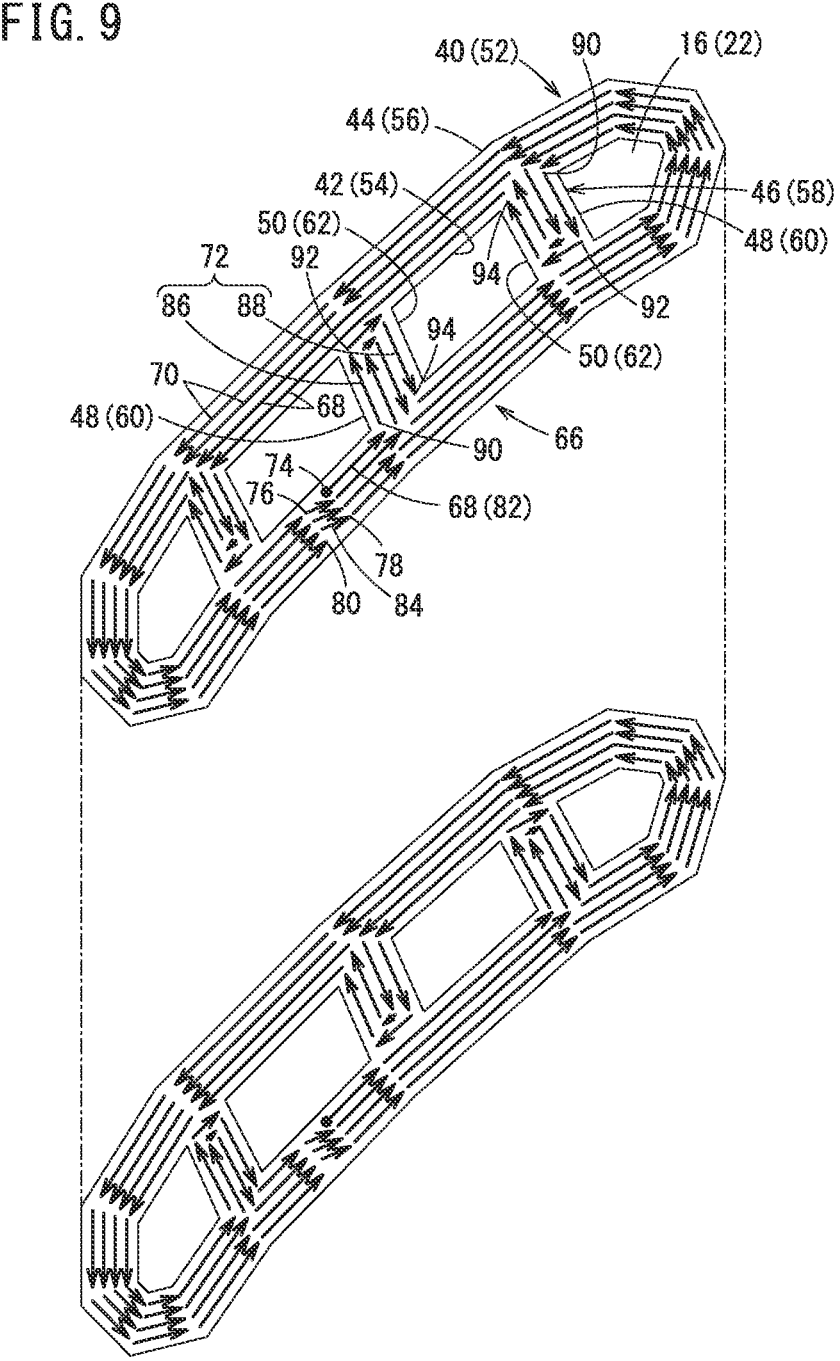
FIG. 9 is a descriptive diagram showing the shaping paths and shaping directions in two layers that are adjacent in a layering direction.

In FIG. 9, four shaping paths are set for the frame region 52. The four shaping paths are two inner shaping paths 68 and two outer shaping paths 70. The two inner shaping paths 68 are arranged in the inner region 54. The two outer shaping paths 70 are arranged in the outer region 56. Accordingly, the two inner shaping paths 68 and the two outer shaping paths 70 are adjacent to each other in the inward-outward direction. The two inner shaping paths 68 and the two outer shaping paths 70 have the same shaping direction. Furthermore, the four shaping paths described above are arranged in the frame region 52 in a manner to be buried in the frame region 52.

In FIG. 9, two rib shaping paths 72 are set for each of the three rib wall portions 46. Among the two rib shaping paths 72, one rib shaping path 72 is a shaping path facing the space 16 (sub-space 22). This one rib shaping path 72 is connected to the inner shaping path 68 that is farthest inward. Among the two rib shaping paths 72, the other rib shaping path 72 is arranged on the inside of the one rib shaping path 72. The other rib shaping path 72 is connected to the inner shaping path 68 adjacent to and outward from the inner shaping path 68 that is farthest inward. For each of the three rib wall portions 46, the two rib shaping paths 72 are arranged inside the rib region 58 in a manner to be buried in the rib region 58. Furthermore, for each of the three rib wall portions 46, a portion of the turnback point 92 of one rib shaping path 72 overlaps with the inner shaping path 68 that is farthest inward.

Furthermore, in FIG. 9, the computing section 29 (see FIG. 1) of the computer 24 determines the inner shaping path 68 that is farthest inward to be the first wall portion shaping path 82. In this case, the computing section 29 of the computer 24 determines the single-instance shaping path 66 by connecting shaping paths that are adjacent to each other, outward from the inner shaping path 68 that is farthest inward. Accordingly, among two shaping paths that are adjacent to each other, the single-instance shaping path 66 is formed by connecting the end point of the wall portion shaping path forming the wall portion first and the start point of the shaping path forming the wall portion afterward, via the connection path 84.

In FIG. 9, the computing section 29 (see FIG. 1) of the computer 24 may determine the outer shaping path 70 that is farthest outward to be the first wall portion shaping path 82. In this case, the computing section 29 of the computer 24 should determine the single-instance shaping path 66 by connecting shaping paths that are adjacent to each other, inward from the outer shaping path 70 that is farthest outward.

In FIG. 9 as well, the computing section 29 (see FIG. 1) of the computer 24 sets the positions of the start point 90 and end point 94 of the rib outgoing path 86 and the position of the turnback point 92 to be different from each other, between adjacent rib shaping paths 72 in one layer. Furthermore, the computing section 29 of the computer 24 sets the rib shaping path 72 such that the position of the one end portion of the rib wall portion 46 and the position of the other end portion of the rib wall portion 46 are switched between two layers adjacent in the layering direction. Due to this, when viewing two layers that are adjacent in the layering direction, the positions of the start point 90 and end point 94 of the rib outgoing path 86 and the position of the turnback point 92 differ from each other between rib shaping paths 72 that are adjacent in the layering direction.

Figure 10:
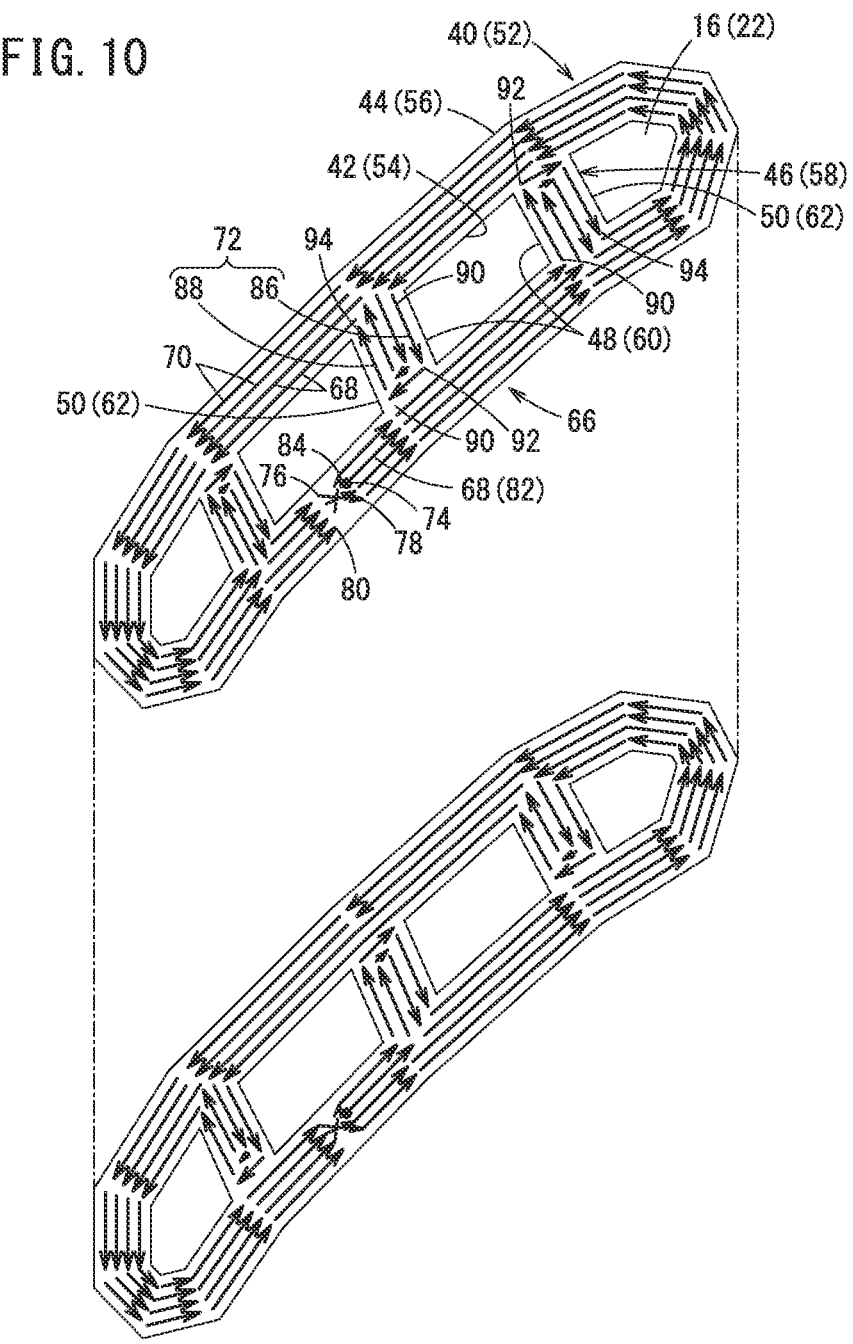
FIG. 10 is a descriptive diagram showing the shaping paths and shaping directions in two layers that are adjacent in the layering direction.

FIG. 10 differs from FIG. 9 in that, among two inner shaping paths 68, the inner shaping path 68 on the outside is determined to be the first wall portion shaping path 82. In FIG. 10, the start point 74 of the inner shaping path 68 on the outside is the start point of the first wall portion shaping path 82. In FIG. 10, the inner shaping path 68 on the outside (first wall portion shaping path 82), the outer shaping path 70 adjacent to the first wall portion shaping path 82, the inner shaping path 68 that is farthest inward, and the outer shaping path 70 that is farthest outward are connected in the stated order. In this case as well, the single-instance shaping path 66 can be formed.

Figure 11:
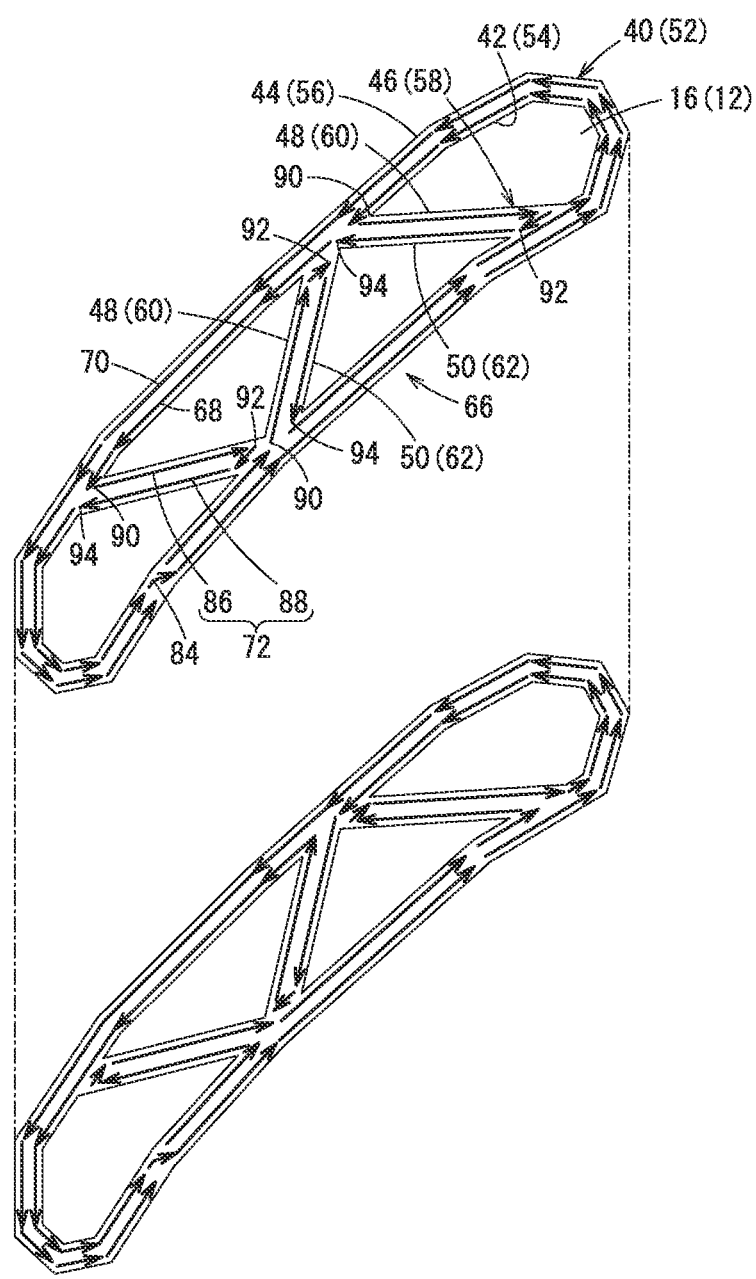
FIG. 11 is a descriptive diagram showing the shaping paths and shaping directions in two layers that are adjacent in the layering direction.

FIG. 11 shows the shaping path 66 occurring when, in a case where three rib wall portions 46 are shaped, the one end portion of one rib wall portion 46 and the other end portion of the other rib wall portion 46 among adjacent rib wall portions 46 are connected to the same location of the inner wall portion 42. In FIG. 11 as well, it is possible to form the single-instance shaping path 66, in the same manner as in FIG. 7. In FIG. 11, the shaping path 66 should be formed such that, for one layer, the turnback point 92 of one rib shaping path 72 and the start point 90 and end point 94 of the other rib shaping path 72 among adjacent rib shaping paths 72 do not overlap.

Figure 12:
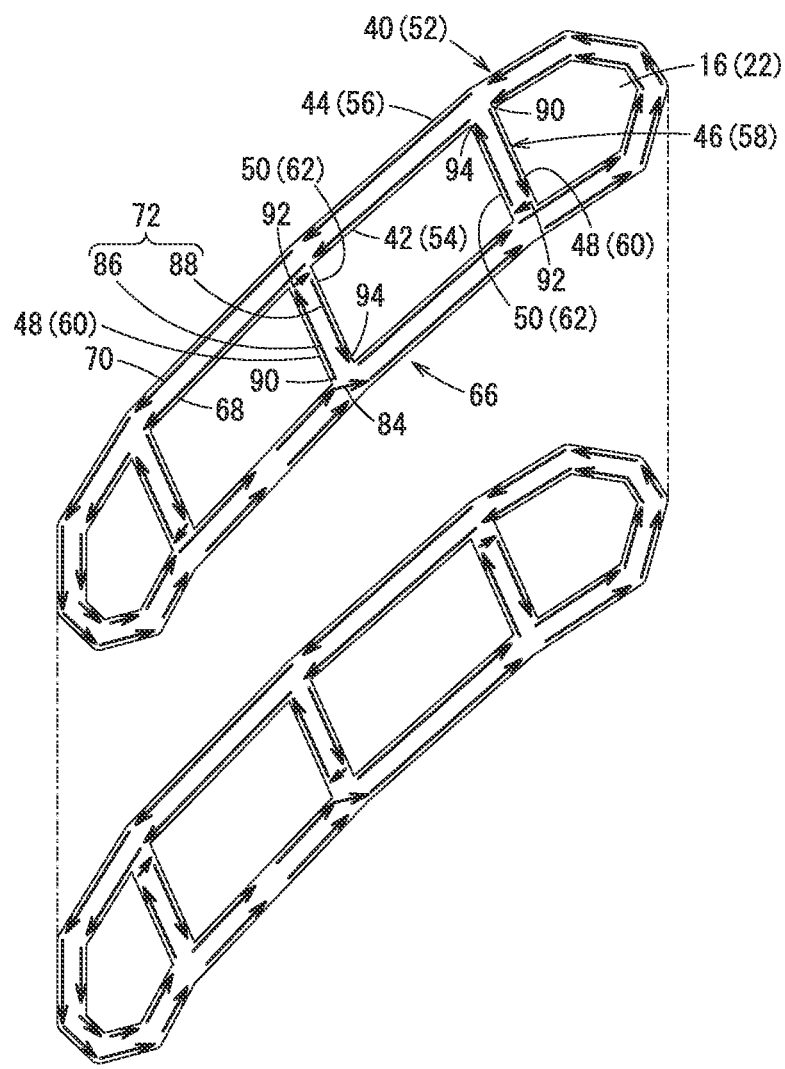
FIG. 12 is a descriptive diagram showing the shaping paths and shaping directions in two layers that are adjacent in the layering direction.

FIG. 12 shows the shaping path 66 in a case where the seam point 64 (see FIG. 6) and the location of the connection between the rib wall portion 46 and the inner wall portion 42 overlap. In FIG. 12 as well, it is possible to form the single-instance shaping path 66, in the same manner as in FIG. 7. In FIG. 12, the shaping path 66 should be formed such that, for one layer, the start point 90, the turnback point 92, and the end point 94 of the rib shaping path 72 do not overlap with the seam point 64.

As described above, at step S3 of FIG. 3, the computing section 29 (see FIG. 1) of the computer 24 can set the shaping path 66 and shaping direction for shaping the three-dimensional object 14 for each of the plurality of layers resulting from the slicing.

At the following step S4, the computing section 29 of the computer 24 generates control code indicating the shaping path 66 (see FIGS. 7 and 9 to 12) and the progression direction, for each of the plurality of layers resulting from the slicing. The computer 24 outputs the control code generated by the computing section 29 to the additive manufacturing apparatus 26. The controller 30 of the additive manufacturing apparatus 26 stores the input control code in the memory 39.

At the following step S5, the additive manufacturing apparatus 26 shapes the three-dimensional object 14 (see FIG. 2) using the additive manufacturing method, based on the control code stored in the memory 39.

The controller 30 drives the stage moving mechanism according to the control code stored in the memory 39. Due to this, the stage 38 (see FIG. 1), is moved to a prescribed position.

Next, the controller 30 drives the material supply source 34 according to the control code. Due to this, the supply of the shaping material 12 from the material supply source 34 to the nozzle 36 is started.

Next, the controller 30 drives the nozzle moving mechanism and controls the nozzle 36, according to the control code. The nozzle moving mechanism moves the nozzle 36 in the horizontal direction. The nozzle 36 melts the shaping material 12 supplied from the material supply source 34 and extrudes the melted shaping material 12 toward the top surface of the stage 38. Due to this, the nozzle 36 extrudes the shaping material 12 while moving in the horizontal direction. The extruded shaping material 12 is layered on the top surface of the stage 38. Due to this, the annular wall portion 40 and rib wall portion 46 (see FIGS. 4 to 7 and 9 to 12) of one layer are formed.

After this, the controller 30 controls the stage moving mechanism to lower the stage 38 downward by a height corresponding to one layer. Next, the controller 30 controls the nozzle 36 and the nozzle moving mechanism. Due to this, the shaping material 12 is extruded from the nozzle 36 while the nozzle 36 moves in the horizontal direction. As a result, the shaping material 12 is layered on the annular wall portion 40 and rib wall portion 46 of the first layer. Due to this, the annular wall portion 40 and rib wall portion 46 of the second layer are formed.

By repeatedly performing the lowering of the stage 38, the movement of the nozzle 36 in the horizontal direction, and the extrusion of the shaping material 12 from the nozzle 36 such as described above, annular wall portions 40 and rib wall portions 46 are layered sequentially upward on the stage 38. Due to this, the three-dimensional object 14 is shaped.

Figure 13:
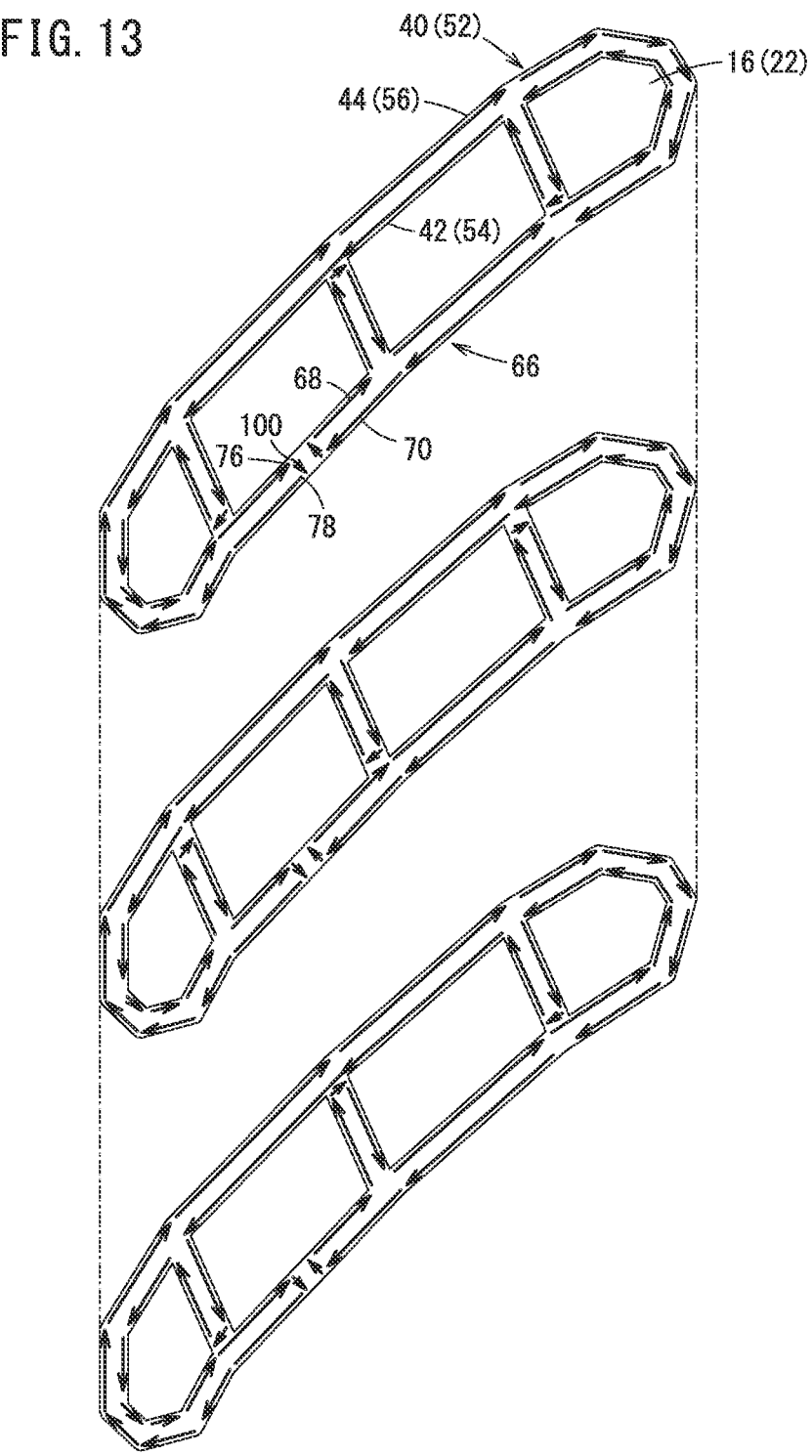
FIG. 13 is a descriptive diagram showing the shaping paths and shaping directions in a plurality of layers in a first comparative example.

FIG. 13 is a descriptive diagram of a shaping path 66 and shaping direction of a first comparative example. In the first comparative example, the shaping direction of the inner shaping path 68 and the shaping direction of the outer shaping path 70 are opposite directions from each other. In the first comparative example, in order to form the single-instance shaping path 66, a turnback point 100 is formed between the end point 76 of the inner shaping path 68 and the start point 78 of the outer shaping path 70.

Figure 14:
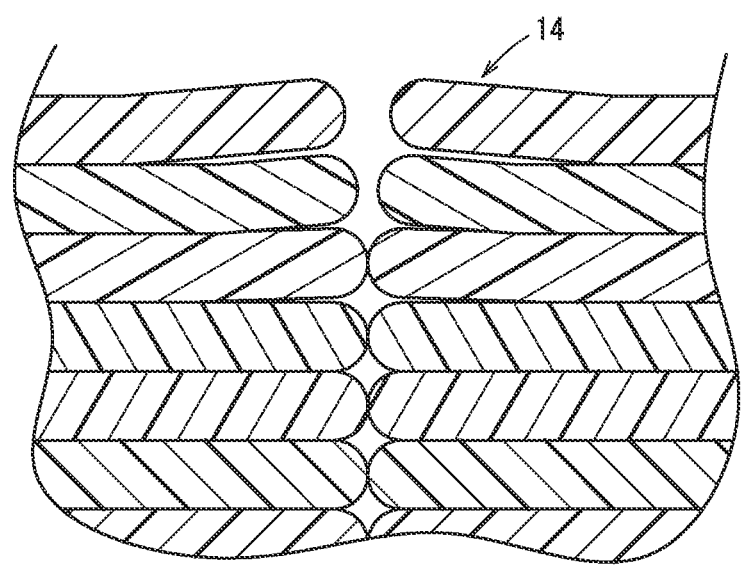
FIG. 14 is a partial cross-sectional view of the three-dimensional object according to the first comparative example.

FIG. 14 is a partial cross-sectional view of the three-dimensional object 14 shaped according to the shaping path 66 of the first comparative example. As described above, in the first comparative example, the shaping direction of the inner shaping path 68 (see FIG. 13) and the shaping direction of the outer shaping path 70 are opposite directions. Therefore, the heat input interval (heat input cycle) at any point in the frame region 52 is not uniform. Due to this, it becomes difficult to perform the temperature control during shaping with high accuracy. As a result, it becomes difficult to preserve the mechanical strength of the three-dimensional object 14 and the shape of the three-dimensional object 14. Furthermore, by providing the turnback point 100, warping occurs at the location corresponding to the turnback point 100 in the three-dimensional object 14. As a result, the appearance of the three-dimensional object 14 becomes worse.

In contrast to this, in the present embodiment, the shaping direction of the inner shaping path 68 (see FIGS. 7 and 9 to 12) and the shaping direction of the outer shaping path 70 are the same direction. Due to this, the heat input interval at any location in the frame region 52 becomes uniform, and the temperature control during shaping can be performed with high accuracy. As a result, it is possible to preserve the mechanical strength of the three-dimensional object 14 (see FIG. 2) and the shape of the three-dimensional object 14. Furthermore, since there is no need for the turnback point 100 (see FIG. 13), the occurrence of warping is avoided. As a result, the appearance of the three-dimensional object 14 can be improved.

Figure 15:
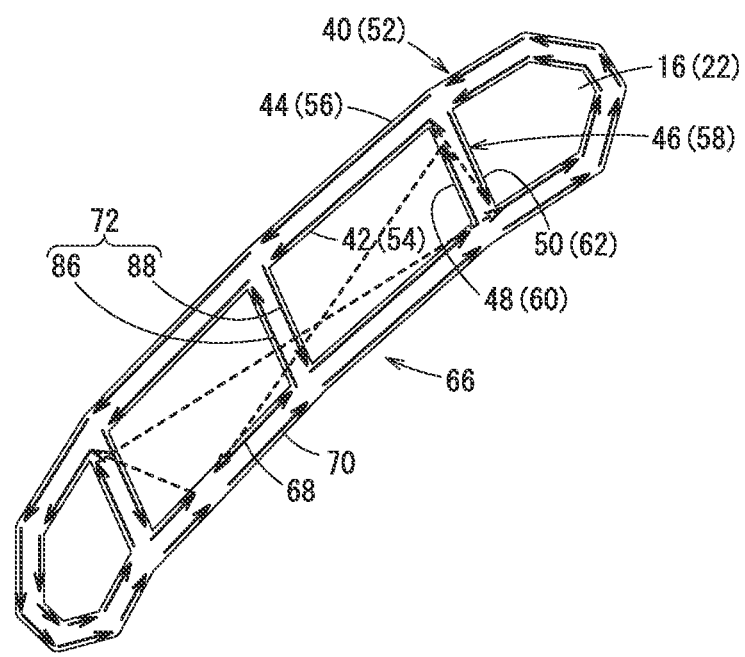
FIG. 15 is a descriptive diagram showing the shaping paths and shaping directions in one layer in a second comparative example.

FIG. 15 is a descriptive diagram showing the shaping path 66 and the shaping direction in one layer of a second comparative example. In the second comparative example, after one rib wall portion 46 is shaped along one rib shaping path 72, the nozzle 36 (see FIG. 1) is moved horizontally and shaping is performed along the next rib shaping path 72, as shown by the dashed lines. Shaping is not performed while the nozzle 36 is moving. Due to this, the time needed to shape the three-dimensional object 14 is increased.

In contrast to this, in the present embodiment, since shaping along the shaping path 66 (see FIGS. 7 and 9 to 12) is performed in a single instance, it is possible to reduce the time needed to shape the three-dimensional object 14 (see FIG. 2).

Figure 16:
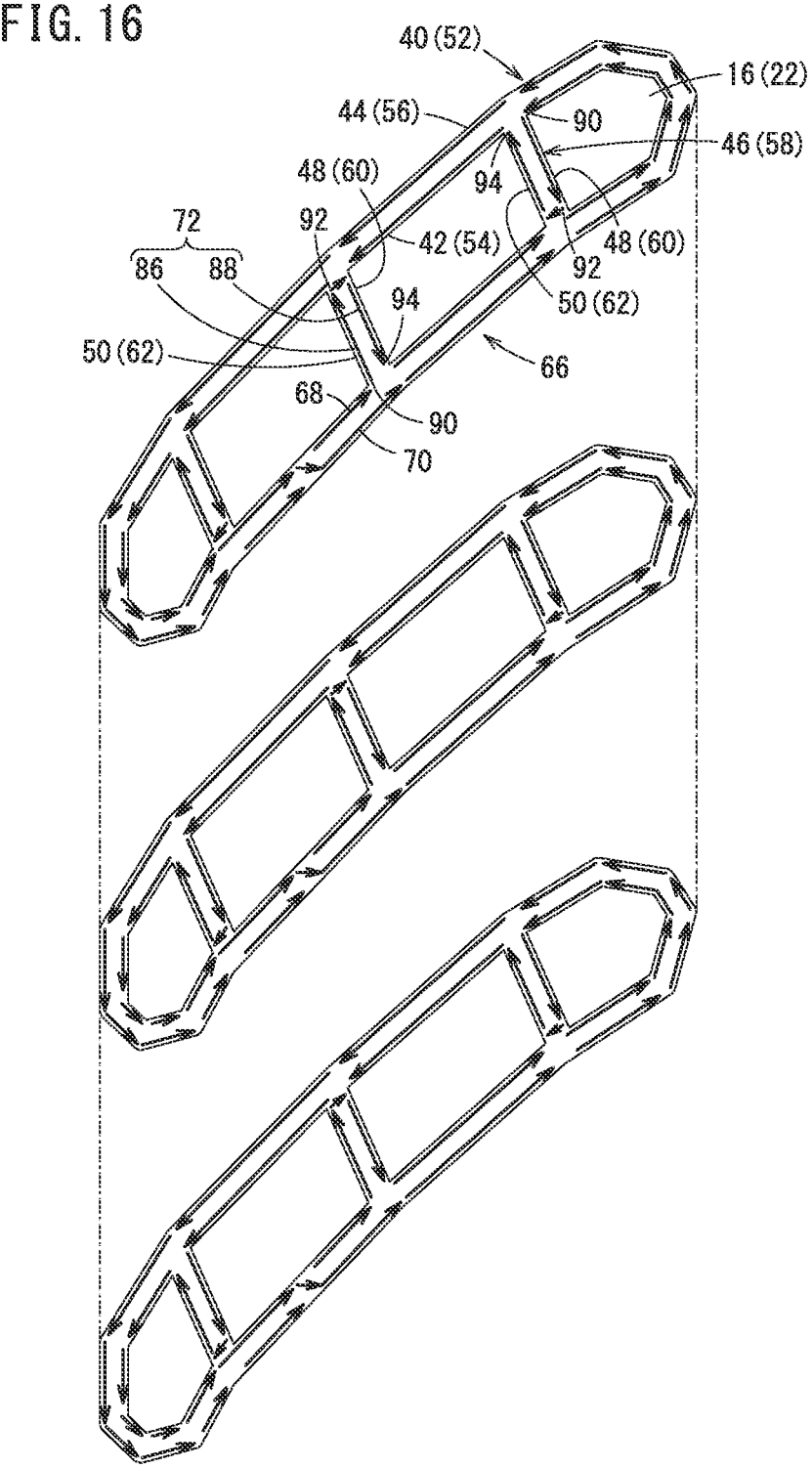
FIG. 16 is a descriptive diagram showing the shaping paths and shaping directions in a plurality of layers in a third comparative example.
Figure 17:
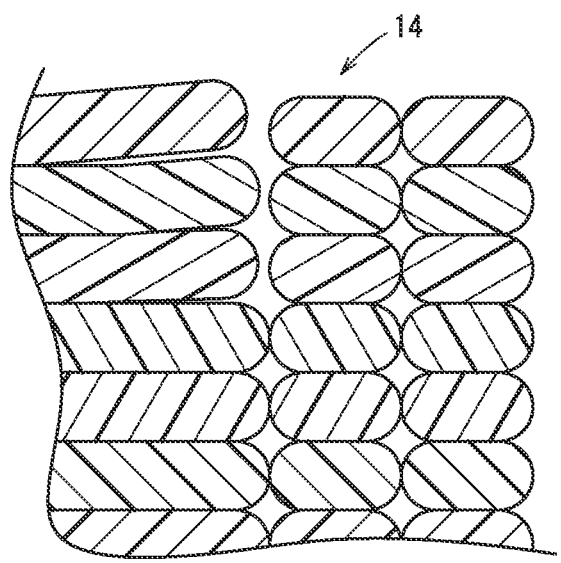
FIG. 17 is a partial cross-sectional view of the three-dimensional object according to the third comparative example.

FIG. 16 is a descriptive diagram showing the shaping path 66 and shaping direction in a plurality of layers of a third comparative example. In the third comparative example, in layers that are adjacent in the layering direction, the positions of the start point 90 and end point 94 of the rib shaping path 72 and the position of the turnback point 92 are set such that the one end portion and the other end portion of the rib wall portion 46 are the same positions. That is, when viewed in the layering direction, the start point 90 and end point 94 of the rib shaping path 72 in adjacent layers are the same and the positions of the turnback point 92 in adjacent layers are also the same. Due to this, as shown in FIG. 17, the portion in the three-dimensional object 14 connecting the rib wall portion 46 (see FIG. 16) and the inner wall portion 42 has a warped shape. As a result, the intended shape of the three-dimensional object 14 cannot be achieved.

Figure 18:
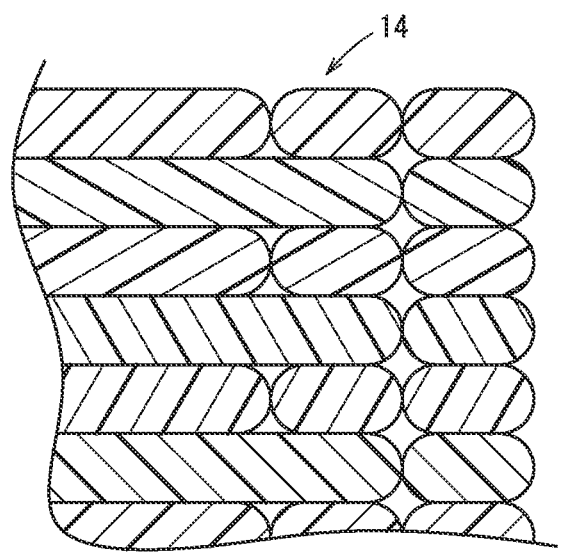
FIG. 18 is partial cross-sectional view of the three-dimensional object according to an embodiment example.

In contrast to this, in the present embodiment, for rib shaping paths 72 (see FIGS. 7 and 9 to 12) that are adjacent in the layering direction, the positions of the start point 90 and end point 94 of the rib shaping path 72 and the positions of the turnback point 92 are different from each other. Due to this, as shown in FIG. 18, it is possible to prevent warping at the portion of the three-dimensional object 14 where the rib wall portion 46 and the inner wall portion 42 connect.

In the present embodiment, as described above, shaping of the three-dimensional object 14 (see FIG. 2) is performed using the additive manufacturing method, according to the shaping path 66 (see FIGS. 7 and 9 to 12) created in advance. Therefore, the present embodiment is capable of shaping the three-dimensional object 14 using various methods that involve melting of the shaping material 12 during shaping. Specifically, the present embodiment may shape the three-dimensional object 14 by using a material extrusion method, a direct energy deposition method, a stereolithography method, a powder bed fusion method, or the like. With the stereolithography method and powder bed fusion method, the three-dimensional object 14 is shaped according to scanning data of a laser or electron beam, which is created in advance.

The following is a record of the invention that can be understood from the above embodiments.

A first aspect of the present invention is the three-dimensional shaping method for shaping the three-dimensional object (14) including the space (16) therein, using the additive manufacturing method, the three-dimensional shaping method including the slicing step (S2) of slicing three-dimensional data of the three-dimensional object into the plurality of layers, the path determining step (S3) of determining the shaping path (66) for shaping the three-dimensional object and the progression direction of the shaping path, for each of the plurality of layers resulting from the slicing, and the shaping step (S5) of shaping the three-dimensional object according to the shaping path and the progression direction in each of the plurality of layers, wherein the shaping path of each of the plurality of layers includes the plurality of wall portion shaping paths (68, 70) for shaping the plurality of annular wall portions (42, 44) that surround the space and are adjacent to each other in the inward-outward direction, and the progression directions of respective wall portion shaping paths face the same direction.

In the present invention, the plurality of wall portion shaping paths for shaping the plurality of annular wall portions surrounding the space are oriented in the same direction. Due to this, it is possible to preserve a constant interval for input heat in each of the plurality of layers. As a result, the mechanical strength of the three-dimensional object is improved. Furthermore, deformation of the shape (such as warping) of the three-dimensional object can be suppressed.

In the first aspect of the present invention, the determining of the shaping path includes determining the shaping path to be traced in the single instance by connecting two of the wall portion shaping paths that are adjacent to each other, in each of the plurality of layers.

Due to this, shaping paths do not cross each other, and therefore it is possible to further suppress the deformation of the shape of the three-dimensional object.

In the first aspect of the present invention, the determining of the shaping path includes determining the wall portion shaping path that is farthest inward or farthest outward to be the first wall portion shaping path (82) for shaping the wall portion first, and determining the shaping path to be traced in the single instance by connecting the plurality of the wall portion shaping paths that are adjacent to each other, in the direction inward or outward from the first wall portion shaping path.

Due to this, it is possible to reliably prevent the shaping paths from crossing each other. As a result, it is possible to further suppress the deformation of the shape of the three-dimensional object.

In the first aspect of the present invention, the shaping path of each of the plurality of layers includes the connection path (84) that connects, among two of the wall portion shaping paths that are adjacent to each other, the first end point (76, 80) of the wall portion shaping path forming the wall portion first and the first start point (74, 78) of the wall portion shaping path forming the wall portion afterward.

Due to this, it is possible to easily and reliably prevent the shaping paths from crossing each other.

In the first aspect of the present invention, the three-dimensional object includes the at least one rib (20) that extends in the layering direction of the plurality of layers and divides the space into the plurality of sub-spaces (22), the shaping path of each of the plurality of layers determined in the determining of the shaping path includes the rib shaping path (72) for shaping the rib wall portion (46), the rib shaping path of each of the plurality of layers includes the rib outgoing path (86), which extends from the predetermined second start point (90) toward the inside of the space until the turnback point (92) in the wall shaping path that is farthest inward, and a rib return path (88), which extends from the turnback point to the predetermined second end point (94) in the wall portion shaping path that is farthest inward, the rib wall portion is formed by having the wall portion (60) formed by the rib outgoing path and the wall portion (62) formed by the rib return path be adjacent to each other, one end portion of the rib wall portion is formed by the second start point and the second end point, the other end portion of the rib wall portion is formed by the turnback point, and the position of the one end portion of the rib wall portion and the position of the other end portion of the rib end portion are switched, between two layers that are adjacent in the layering direction.

Due to this, the second start point and second end point and the turnback point are switched between two layers adjacent in the layering direction. As a result, in the three-dimensional object, it is possible to suppress warping occurring at the location corresponding to the turnback point.

In the first aspect of the present invention, the three-dimensional object includes the at least two of the ribs that extend in the layering direction and divide the space into the plurality of the sub-spaces; and in each of the plurality of layers, the position of one end portion and the position of the other end portion are switched between adjacent rib wall portions.

When the second start points and second end points of the respective plurality of rib shaping paths are arranged concentrated in just one of the wall portion shaping paths in each of the plurality of layers, the input heat interval for the other wall portion shaping path becomes long. Therefore, by switching the second start point and second end point and the turnback point between adjacent rib shaping paths in each of the plurality of layers, it is possible to evenly spread the input heat interval.

In the first aspect of the present invention, in the rib shaping path, the portion of the turnback point overlaps with the wall portion shaping path that is farthest inward.

Due to this, even if the shaping material cools and contracts after shaping of the three-dimensional object, it is possible to favorably and reliably connect the annular wall portion and the rib.

In the first aspect of the present invention, with the additive manufacturing method, the three-dimensional object is shaped by layering the shaping material (12) extruded from the nozzle (36), and the shaping of the three-dimensional object includes moving the nozzle in the progression direction along the shaping path in each of the plurality of layers.

Due to this, it is possible to suppress a decrease in the mechanical strength of the three-dimensional object caused by a decrease in the temperature of the shaping material. Furthermore, it is possible to suppress a worsening of the appearance of the three-dimensional object caused by an increase in the temperature of the shaping material.

A second aspect of the present invention is the three-dimensional shaping apparatus (10) that shapes the three-dimensional object including the space therein, using an additive manufacturing method, the three-dimensional shaping apparatus including the data slicing section (24) configured to acquire three-dimensional data of the three-dimensional object and slice the acquired three-dimensional data into the plurality of layers, the path determining section (24) configured to determine the shaping path for shaping the three-dimensional object and the progression direction of the shaping path, for each of the plurality of layers sliced by the data slicing section, and the shaping section (26) configured to shape the three-dimensional object according to the determined shaping path and progression direction in each of the plurality of layers determined by the path determining section, wherein the shaping path of each of the plurality of layers includes the plurality of wall portion shaping paths for shaping the plurality of annular wall portions that surround the space and are adjacent to each other in the inward-outward direction, and the progression directions of respective wall portion shaping paths face the same direction.

With the present invention as well, the plurality of wall portion shaping paths for shaping the plurality of annular wall portions surrounding the space are oriented in the same direction. Due to this, it is possible to preserve a constant interval for input heat in each of the plurality of layers. As a result, the mechanical strength of the three-dimensional object is improved. Furthermore, deformation of the shape (such as warping) of the three-dimensional object can be suppressed.

The present invention is not limited to the above-described disclosure, and it goes without saying that various modifications could be adopted therein without departing from the essence and gist of the present invention.

What is claimed is:

1. A three-dimensional shaping method for shaping a three-dimensional object including a space therein, using an additive manufacturing method, the three-dimensional shaping method comprising:
    slicing three-dimensional data of the three-dimensional object into a plurality of layers;
    determining a shaping path for shaping the three-dimensional object and a progression direction of the shaping path, for each of the plurality of layers resulting from the slicing; and
    shaping the three-dimensional object according to the shaping path and the progression direction in each of the plurality of layers,
    wherein the three-dimensional object includes at least one rib that extends in a layering direction of the plurality of layers and divides the space into a plurality of subspaces,
    the shaping path of each of the plurality of layers includes a plurality of wall portion shaping paths for shaping a plurality of annular wall portions that surround the space and are adjacent to each other in an inward-outward direction and a rib shaping path for shaping a solid rib wall portion,
    in determining the shaping path, the shaping path is set so as to make a width between the plurality of wall portions and a width of the rib wall portion same, and the shaping path to be traced in a single instance is determined by connecting two of the wall portion shaping paths that are adjacent to each other, in each of the plurality of layers,
    the progression directions of respective wall portion shaping paths face a same direction,
    the rib shaping path of each of the plurality of layers includes a rib outgoing path, which extends from a predetermined first start point toward inside of the space until a turnback point in the wall shaping path that is farthest inward, and a rib return path, which extends from the turnback point to a predetermined first end point in the wall portion shaping path that is farthest inward,
    the rib wall portion is formed by having a wall portion formed by the rib outgoing path and a wall portion formed by the rib return path be adjacent to each other,
    one end portion of the rib wall portion is formed by the first start point and the first end point,
    another end portion of the rib wall portion is formed by the turnback point, and
    between two layers that are adjacent in the layering direction, positions of the first start point and the first end point and a position of the turnback point are switched, whereby a position of the one end portion of the rib wall portion and a position of the other end portion of the rib end portion are switched.

2. The three-dimensional shaping method according to claim 1, wherein the determining of the shaping path includes determining the wall portion shaping path that is farthest inward or farthest outward to be a first wall portion shaping path for shaping the wall portion first, and determining the shaping path to be traced in a single instance by connecting a plurality of the wall portion shaping paths that are adjacent to each other, in a direction inward or outward from the first wall portion shaping path.

3. The three-dimensional shaping method according to claim 1, wherein the shaping path of each of the plurality of layers includes a connection path that connects, among two of the wall portion shaping paths that are adjacent to each other, a second end point of the wall portion shaping path forming the wall portion first and a second start point of the wall portion shaping path forming the wall portion afterward.

4. The three-dimensional shaping method according to claim 1, wherein:
    the three-dimensional object includes at least two of the ribs that extend in the layering direction and divide the space into a plurality of the sub-spaces; and
    in each of the plurality of layers, the position of one end portion and the position of the other end portion are switched between adjacent rib wall portions.

5. The three-dimensional shaping method according to claim 1, wherein in the rib shaping path, a portion of the turnback point overlaps with the wall portion shaping path that is farthest inward.

6. The three-dimensional shaping method according to claim 1, wherein:
    with the additive manufacturing method, the three-dimensional object is shaped by layering a shaping material extruded from a nozzle; and
    the shaping of the three-dimensional object includes moving the nozzle in the progression direction along the shaping path in each of the plurality of layers.

7. A three-dimensional shaping apparatus that shapes a three-dimensional object including a space therein, using an additive manufacturing method, the three-dimensional shaping apparatus comprising one or more processors that execute computer-executable instructions stored in a memory,
    wherein the one or more processors execute the computer-executable instructions to cause the three-dimensional shaping apparatus to:

acquire three-dimensional data of the three-dimensional object and slice the acquired three-dimensional data into a plurality of layers;

determine a shaping path for shaping the three-dimensional object and a progression direction of the shaping path, for each of the plurality of layers resulting from the slicing; and shape the three-dimensional object according to the determined shaping path and progression direction in each of the plurality of layers, wherein the three-dimensional object includes at least one rib that extends in a layering direction of the plurality of layers and divides the space into a plurality of subspaces, the shaping path of each of the plurality of layers includes a plurality of wall portion shaping paths for shaping a plurality of annular wall portions that surround the space and are adjacent to each other in an inward-outward direction and a rib shaping path for shaping a solid rib wall portion, the shaping path is set so as to make a width between the plurality of wall portions and a width of the rib wall portion same, and the shaping path to be traced in a single instance is determined by connecting two of the wall portion shaping paths that are adjacent to each other, in each of the plurality of layers, the progression directions of respective wall portion shaping paths face a same direction, the rib shaping path of each of the plurality of layers includes a rib outgoing path, which extends from a predetermined first start point toward inside of the space until a turnback point in the wall shaping path that is farthest inward, and a rib return path, which extends from the turnback point to a predetermined first end point in the wall portion shaping path that is farthest inward, the rib wall portion is formed by having a wall portion formed by the rib outgoing path and a wall portion formed by the rib return path be adjacent to each other, one end portion of the rib wall portion is formed by the first start point and the first end point, another end portion of the rib wall portion is formed by the turnback point, and between two layers that are adjacent in the layering direction, positions of the first start point and the first end point and a position of the turnback point are switched, whereby a position of the one end portion of the rib wall portion and a position of the other end portion of the rib end portion are switched.

* * * * *